Feb. 17, 1953 P. ASTRUCK 2,628,352
SUNGLASSES, GOGGLES, AND THE LIKE
Filed March 6, 1951 3 Sheets-Sheet 1
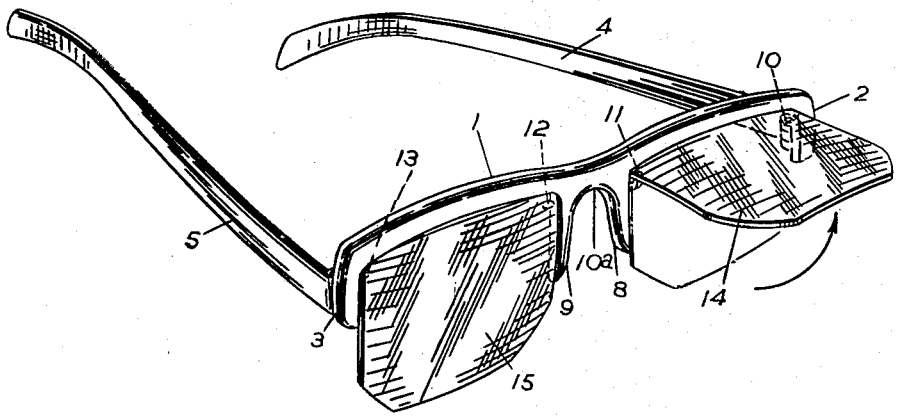
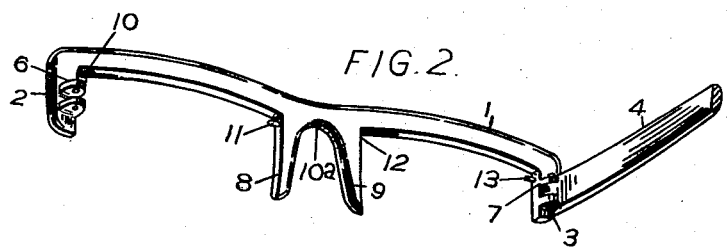
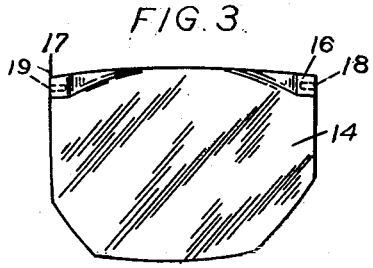
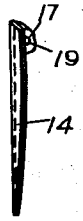
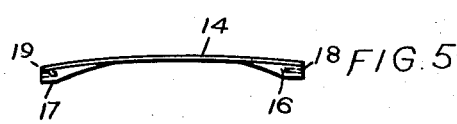
Inventor
Paul Astruck
By
Attorneys.

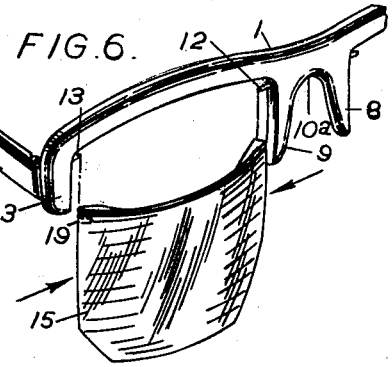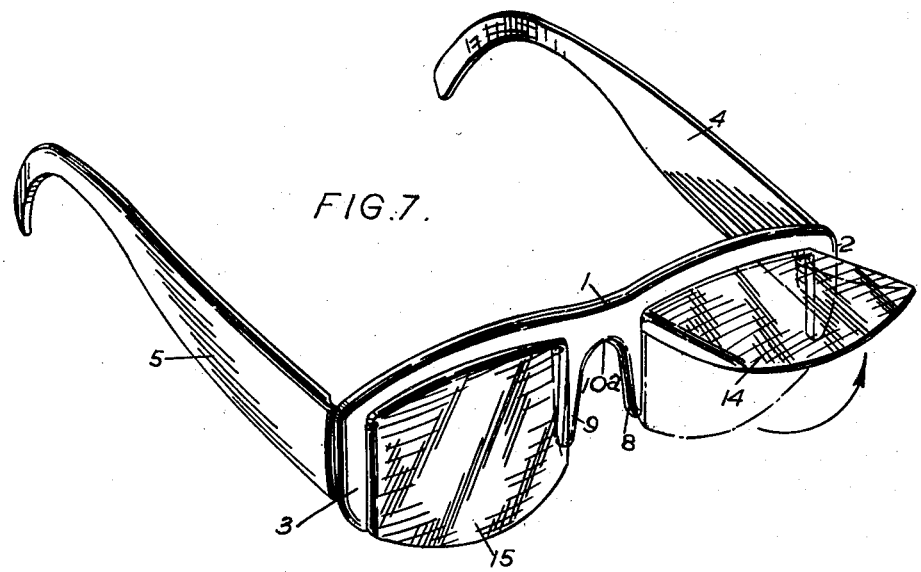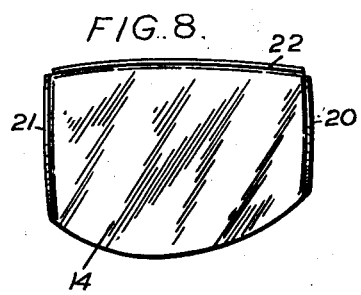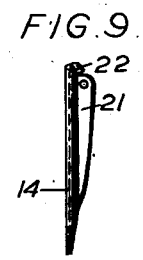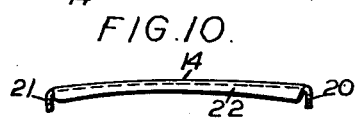

Feb. 17, 1953 P. ASTRUCK 2,628,352
SUNGLASSES, GOGGLES, AND THE LIKE
Filed March 6, 1951 3 Sheets-Sheet 3
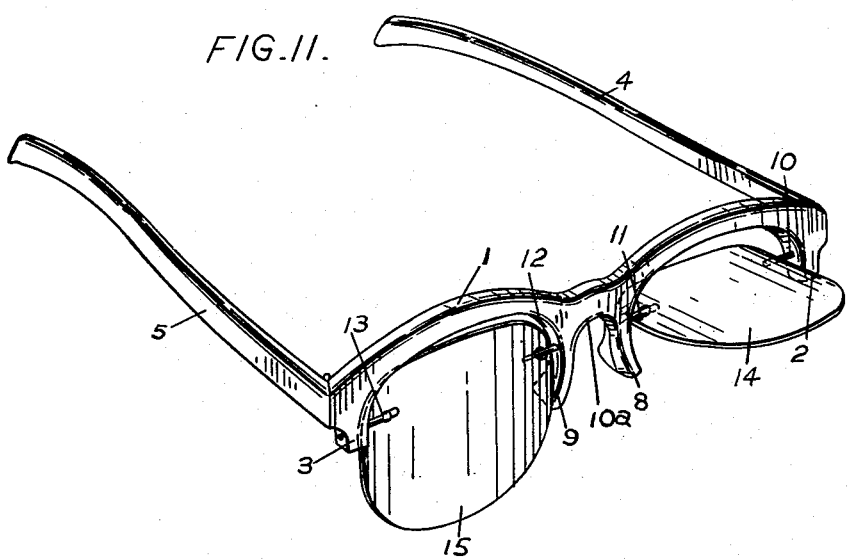
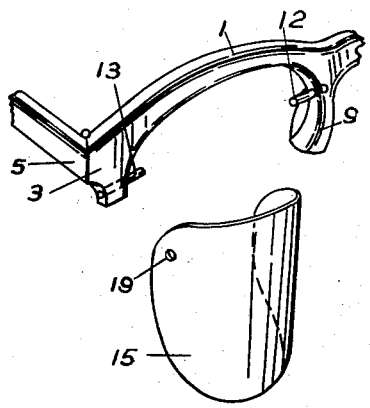
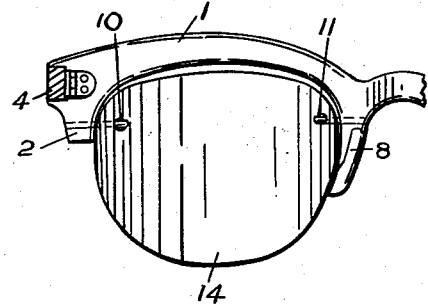
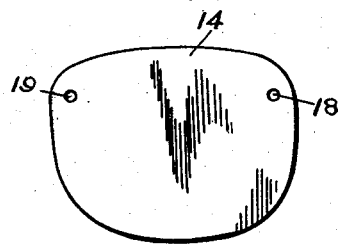
Inventor
Paul Astruck
By Morris L. Pittman
Attorneys.

Patented Feb. 17, 1953

2,628,352

UNITED STATES PATENT OFFICE 2,628,352

SUNGLASSES, GOGGLES, AND THE LIKE

Paul Astruck, Northampton, England

Application March 6, 1951, Serial No. 214,143
In Great Britain March 14, 1950

3 Claims. (Cl. 2—14)

This invention relates to sun glasses, goggles and the like for the eyes in which the eye-pieces are hingedly mounted in a frame so as to be movable in the frame to be over the eyes or at various upward angles in front of the eyes, and has for its object to construct such type of sun glasses, goggles or the like in an improved manner.

According to this invention, a pair of sun glasses, goggles or the like comprises a frame with hingedly connected ear-pieces, a bridge for the nose, and flexible eye-pieces hingedly connected to the frame on short projections such as lugs or pins on the frame engaging in sockets such as recesses or holes in the side edges of the eye-pieces, or by short lugs or pins on the eye-pieces engaging in holes or recesses in the frame.

Preferably the eye-pieces are of greater width than the eye-piece openings so that when engaged on the lugs or pins the eye-pieces are slightly concave and under tension.

The invention will be clearly understood from the following description aided by the accompanying drawings, in which:

Figure 1 is a front perspective view of a pair of sun glasses showing one example of carrying the invention into effect. Figure 2 is a perspective view of the frame from the rear. Figure 3 is a rear view of one of the eye-pieces. Figure 4 a side view and Figure 5 a plan of same. Figure 6 is a front perspective view of part of the frame showing an eye-piece flexed ready to be engaged in the frame.

Figure 7 is a front perspective view of a pair of sun glasses showing a modified construction. Figure 8 a front view. Figure 9 a side view and Figure 10 a plan of a modified eye-piece.

Figure 11 is a perspective view of a further modified construction. Figure 12 is a front perspective view of part of the frame showing an eye-piece flexed ready to be engaged in the frame. Figure 13 is a rear view of part of the frame showing an eye-piece in position, and Figure 14 is a front view of an eye-piece.

In the example shown in Figures 1 to 6 of the accompanying drawings, a pair of sun glasses comprises a frame formed of a top bar 1 having a depending side bar 2, 3 at each end, the ear-pieces 4, 5 being hingedly connected to the side bars 2, 3 by hinges 6, 7. In the centre of the top bar 1 are two depending bars 8, 9 at a little distance apart formed with a nose bridge 10a between the two centre bars 8, 9.

On the inside of each side bar 2, 3 and each centre bar 8, 9 and near the top bar 1 is formed a small pointed lug or pin 10, 11, 12, 13, so that the frame, which is in fact a half frame, incorporates four small pointed lugs 10, 11, 12, 13 which are made to act as hinge pins for the adjustable eye-pieces.

The lugs 10, 11, 12, 13 are lined up to ensure that the line of hinge movement is above the eye level when the glasses are in use and not to interfere with the vision.

The eye-pieces 14, 15 are of transparent coloured material and each is formed with a thickened portion 16, 17 near the top and one on each side and in each thickened portion 16, 17 is formed a small recess or hole 18, 19 complementary to the lugs 10, 11, 12, 13 on the frame.

Preferably the eye-pieces 14, 15 are moulded in thin plastic of overall thickness except for the thickened portions which permits flexibility.

The top width of each eye-piece 14, 15 is greater than the distance between the eye-piece openings and the eye-pieces 14, 15 are flexed to allow of their being engaged with the lugs 10, 11, 12, 13, as will be seen in Figure 6, and when the eye-pieces 14, 15 are hingedly engaged with the lugs the eye-pieces are slightly concave.

This is important since the tension created by the flexing of the eye-pieces 14, 15 acts as a retaining force for preventing the eye-pieces 14, 15 becoming disengaged from the lugs whatever the position of the eye-pieces 14, 15 and the spring like tension will hold the eye-pieces 14, 15 in position.

In the example shown in Figures 1 and 2, the side bars 2, 3 and centre bars 8, 9 are comparatively short in relation to the eye-pieces 14, 15. In the modification shown in Figure 7, the side bars 2, 3 and centre bars 8, 9 are comparatively long in relation to the eye-pieces 14, 15 being of substantially a length equal to the height of the eye-pieces 14, 15.

In the modification of the eye-pieces 14, 15 shown in Figures 8, 9 and 10, instead of thickening the side edges of the eye-pieces 14, 15, the eye pieces are formed with side flanges 20, 21 in which the holes 18, 19 are formed. The top edge may also be formed with a narrow flange 22.

In the modification shown in Figures 11 to 14 of the drawings, instead of forming the lugs 10, 11, 12, 13 integrally with the frame, separate metal pins 10, 11, 12, 13 are moulded in with the frame, or secured in holes in the frame.

In this example the eye-pieces 14, 15 are flat pieces of plastic formed with holes 18, 19 near the side edges and the eye-pieces 14, 15 are flexed and positioned in the eye-piece openings with the pins 10, 11, 12, 13 engaging in the holes 18, 19 in the eye-pieces 14, 15, as will be understood from the drawings.

Conveniently the frame may be moulded in plastic.

What I claim as my invention is:

1. A pair of sun glasses, goggles or the like, comprising a frame consisting of a top bar having a depending side bar at each end, two centre depending bars at a little distance apart with a nose piece bridge between the two centre bars, a small lug or pin on the inside of each side bar and each centre bar and near the top bar, eye-pieces composed of flexible transparent coloured material formed with a thickened portion on each side edge near the top, a hole or recess in each thickened portion of each eye-piece so arranged that the holes or recesses in the eye-pieces can be engaged with the appropriate lugs or pins and on which each eye-piece can hinge, the eye-pieces being of greater width than the eye-piece openings so that when in position in the frame the eye-pieces are slightly concave and flexed, and ear-pieces hingedly connected to the side bars, substantially as set forth.

2. A pair of sun glasses, goggles or the like, comprising a frame consisting of a top bar having a depending side bar at each end, two centre depending bars at a little distance apart with a nose bridge between the two centre bars, a pin secured to the inside of each side bar and each centre bar near the top bar, eye-pieces of thin flat flexible transparent coloured material formed with a hole adjacent each side edge near the top, so arranged that the holes in the eye-pieces can be engaged with the appropriate pins on which the eye-pieces can hinge, the eye-pieces being of greater width than the eye-piece openings, so that when in position in the frame, the eye-pieces are slightly concave and flexed, and ear-pieces hingedly connected to the side bars, substantially as set forth.

3. A pair of sun glasses, goggles or the like, comprising a frame having laterally spaced downwardly extending side and center bars forming a pair of eye-piece openings, the adjacent side and center bars having alined projections extending from their upper portions toward one another and into the respective eye-piece openings, and eye-pieces composed of flexible transparent material and provided with sockets on their side edges to receive the projections extending into the respective eye-piece openings, the eye-pieces being of greater width than the eye-piece openings and being normally flat but flexible into bowed form to engage their sockets with the respective projections for pivotal movement thereon, and the eye-pieces being in flexed bowed form with their side edges abutting frictionally against the respective side and center bars of the frame while the eye-pieces are in position in the respective eye-piece openings.

PAUL ASTRUCK.

REFERENCES CITED

The following references are of record in the file of this patent:

UNITED STATES PATENTS

| Number | Name | Date |
| --- | --- | --- |
| 1,685,725 | Rowe | Sept. 25, 1928 |
| 2,510,539 | Arbenz | June 6, 1950 |

FOREIGN PATENTS

| Number | Country | Date |
| --- | --- | --- |
| 452,266 | Great Britain | Aug. 19, 1936 |